United States Patent
Aubart et al.

(10) Patent No.: US 6,767,978 B2
(45) Date of Patent: Jul. 27, 2004

(54) COPOLYMERS CONTAINING FLUORO AND SILYL GROUPS AND THEIR USE IN MARINE ANTIFOULANT COMPOSITION

(75) Inventors: Mark Anthony Aubart, Malvern, PA (US); Elisabeth Patricia Guittard, Nice (FR); Gary Stephen Silverman, Chadds Ford, PA (US); Kenneth Kuo-shu Tseng, Lawrenceville, NJ (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 0 days.

(21) Appl. No.: 10/202,728

(22) Filed: Jul. 25, 2002

(65) Prior Publication Data

US 2003/0158358 A1 Aug. 21, 2003

Related U.S. Application Data

(60) Provisional application No. 60/346,207, filed on Jan. 3, 2002.

(51) Int. Cl.$^7$ ............................................. C08F 120/22
(52) U.S. Cl. .................... 526/245; 526/279; 526/328.5; 526/329.7
(58) Field of Search ................................. 526/245, 279, 526/328.5, 329.7

(56) References Cited

U.S. PATENT DOCUMENTS

| | | | |
|---|---|---|---|
| 4,410,363 A | | 10/1983 | Supcoe et al. |
| 4,593,055 A | | 6/1986 | Gitlitz et al. |
| 4,883,852 A | | 11/1989 | Masuoka et al. |
| 5,436,284 A | * | 7/1995 | Honda et al. ................ 523/122 |
| 5,767,171 A | * | 6/1998 | Matsubara et al. ......... 523/122 |
| 5,786,392 A | * | 7/1998 | Silverman et al. ....... 514/772.4 |
| 5,795,374 A | * | 8/1998 | Itoh et al. ..................... 106/16 |
| 5,912,286 A | | 6/1999 | Griffith et al. |
| 2002/0032290 A1 | * | 3/2002 | Uchiumi et al. ............. 526/177 |
| 2003/0059599 A1 | * | 3/2003 | Beckley et al. .............. 428/327 |

FOREIGN PATENT DOCUMENTS

| | | |
|---|---|---|
| EP | 0 051 930 A2 | 10/1981 |
| EP | 0 801 117 A2 | 10/1997 |
| EP | 0 874 032 A2 | 10/1998 |
| EP | 0 885 938 A2 | 12/1998 |
| EP | 0 885 938 B1 | 7/2002 |
| EP | 0 874 032 B1 | 5/2003 |
| JP | 08 134381 | 5/1996 |
| WO | WO 99/05548 | 2/1999 |
| WO | WO 99/33927 | 7/1999 |

OTHER PUBLICATIONS

"A New Approach in the Development and Testing of Antifouling Paints without Organotin Derivatives" K. Vallee–Rehel, et al.; vol. 70, No. 880, May 1998; pp. 55–63.
Self Assembled Water–Borne Fluoropolymer coatings for Marine Fouling Resistance, R. F. Brady, Jr., et al; Surface Coatings International 1999 (12)—pp. 582–585.
"Clean Hulls Without Poisons: Devising and Testing Nontoxic Marine Coatings" Robert F. Brady, Jr.—Naval Research Laboratory; Journal of Coatings Technology—vol. 72, No. 900, Jan. 2000; pp. 45–46.
"Marine Biofouling and Its Prevention on Underwater Surfaces" John A. Lewis, Aeronautical and Maritime Research Laboratory; Materials Forum (1998) 22,—pp. 41–61.

* cited by examiner

*Primary Examiner*—Bernard Lipman
(74) *Attorney, Agent, or Firm*—Nicholas J. DeBenedictis; Thomas F. Roland

(57) ABSTRACT

Copolymers of at least three monomer units selected from the group consisting of fluorinated acrylic (methacrylic) monomers, triorganosilylacrylic (e.g. trimethylsilyl methacrylate) monomers and acrylic monomers not containing an organosilyl moiety, (e.g. methyl methacrylate) and optionally containing from 0–5 weight percent of a crosslinking agent are novel compositions useful as polymeric binders in long life marine antifoulant coatings. The erosion rate and resistance to cracking of the copolymer of the present invention when used as a binder in a marine antifoulant paint is controlled by adjusting the proportions of each monomer and the amount of crosslinking agent in the copolymer of the present invention

11 Claims, 1 Drawing Sheet

COPOLYMERS CONTAINING FLUORO AND SILYL GROUPS AND THEIR USE IN MARINE ANTIFOULANT COMPOSITION

This application claims priority of U.S. Provisional Application No. 60/346,207 filed Jan. 3, 2002.

BACKGROUND OF THE INVENTION

Marine organisms such as algae and barnacles attach to the surfaces of structures placed in oceans and lakes. This marine growth has little effect on the integrity of the structure such as ships, boats, pilings, water intake and outfall (coatings) pipes. (Worms and bores do attack woods and plastics.) However, their presence can seriously hamper the operation of these systems, resulting in loss of cooling and fuel efficiency. It has been common practice to coat the substrate surfaces of wood, plastic and metal with coating compositions which inhibit attachment and/or growth of marine organisms. Such coating compositions are usually referred to as antifoulant coatings or antifoulant paints and consist of a polymeric binder material, a toxicant, a pigment, solvents, and adjuvants to aid in adhesion, flow, color, viscosity, stability, etc. The range of compositions for marine antifoulant application is enormous and has evolved from changing needs. For example, 1–2 years protection was adequate for most ships which were dry-docked every 1 or 2 years for routine maintenance and were stripped and repainted with new antifoulants while in dry dock. With the advent of the super tanker, greatly extended intervals between dry docking were required—typically 3 to 5 years. Thus, the need for longer life antifoulant coatings was created. This need was in great measure met by the extended performance made possible by polymerizable antifoulants, such as organotin methacrylates, which became part of the coating polymeric binder. Improvements were also made by creating coatings which controlled erosion and toxicant leach rates to approach the 5 year life requirement.

In addition to extended life requirements for marine antifoulant coatings, concern for the possible effects of antifoulant toxicants on the environment has encouraged the development and use of systems which attempt to control fouling through surface modification; for example, prevention of attachment through the use of silicon or fluorine containing polymers having non-stick or release properties.

The development and current state of the art of marine antifoulant coatings can be found in articles such as:

1. Clean Hulls Without Poisons: Devising and testing non-toxic marine coatings. Robert F. Brady Jr., Coatings Technology, Vol. 72#900, January 2000.
2. A New Approach in the Development and Testing of Antifouling Paints Without Organotin Derivatives. K. Vullei Rehel, B. Mariette, P. Hoarau, P. Guerin, V. Longlois, J-Y. Longlois, Journal of Coatings Technology, Vol. 70, #880, May 1998.
3. Marine Biofouling And It's Prevention on Underwater Surfaces. J. A. Lewis, Material Forum (1998), 22, 41–61.

Marine Antifoulants, Silcon/Fluorine

"Marine Biofouling and it's Prevention on Underwater Surfaces", by Lewis, J. A., Materials Forum, (1998) 22, 41–61, is a recent comprehensive review of marine antifoulant agents. An extensive bibliography and references are included. This paper makes reference to binders studied such as acrylic copolymers with pendant hydrolysable functions and a variable hydrophobic/hydrophilic balance. Reference #45 from which this description is taken is a thesis in French, by Fadel, A.—Thesis Universite de Rennes I, "Synthesis et Application de Resines Erodable pour Peintures Antisalissures de Nouvelle Generation", 1994. This reference does not disclose the compositions of the present invention.

WO, 0014166A1, Judith Stein, General Electric Co., 2000, 03,16 describes curable silicone foul free release coatings and articles. No fluoro compounds are present.

"Silicone Containing Fluropolymer Coatings Composition for Controlled Release of Organic Leachants". James Griffith, Stephen Snyder, U.S. patent application Ser. No. 921054A0. This patent application discloses the use of fluoro-epoxy compounds and silicone amine curing agents rather than fluoro(meth)acrylates and silyl(meth)acrylate monomers to produce marine antifoulant binders. The resultant copolymers of Griffith are highly crosslinked.

JP 53113014, 19781003. Tachida, Toshij, "Material for the Prevention of Adhesion of Organisms in Water". Release coating as antifoulants are prepared from fluorinated polymers, above, e.g. polytetrafluorethylene. No silicon is present.

Additional antifoulant release coatings are described in the following patents and patent applications, none of which describes the compositions of the instant invention: U.S. Ser. No. 251419A0—application, U.S. Ser. No. 92847401—application, DE 2752773, EP 874032A2, EP 885938A2, JP 0319073A2, JP 319074A2, JP 04217902A2, JP 04227770A, JP 04264168A2, JP 04264169A2, JP 04264170A2, JP 070033191A, JP 07138504A2, JP 11061002A2, JP 61097374A2.

Further information on antifouling release coatings may be found in the following articles: "The Antifouling Potential of Silicone Elastomer Polymers", Clarkson, Nancy. Recent Advance Marine Biotechnol (1999) 3, 87–108; "Synthesis of Perfluorinated Acrylate and Methacrylate Fouling Release Polymers", Arios, E M, Putnam, M. et al. Book of Abstracts 213th ACS National Meeting, San Francisco, Apr. 13–17, 1997; and "Fluoropolymers and Silicone Fouling Release Coatings", Bultman, J. D., Griffith, James R., Recent Developments in Biofouling—Control, 1994, 383–9.

Self Polishing antifoulant paints are described in several patent and patent applications such as: EP 51930A2—Marine Paint, International Paint Co., Ltd. Sghlbontz, C M. Which describes self-polishing marine paints comprising a copolymer methacrylate, methylmethacrylate and a organotin monomer.

Hydrophobic/hydrophilic polymers for use in marine antifoulant paints have been described in the prior art.

"Graft Copolymers for Erodible Resins, from Alpha-Hydroxyacid Oligomer Macromonomers and Acrylic Monomers", Vallae, Rehel, et al—J. Environmental Polymer Degradation (1999) 71 (1) 27–34. This article discusses the compositions with defined hydrophobic/hydrophilic balance, but differs from the present invention in the use of alpha-methacryloryloxy-alpha-hydrox acid macromonomers.

Konstandt, Felix. FR 2165881, discloses a solution of polyethylenimine or its hydrophilic derivatives with a hydrophilic acrylic polymer for coating boats below the water line. This compositions differs from the instant invention in that it lacks any fluoro-containing compounds.

EP 0801117A2—Haradaa, A., Contains hydrophobic and hydrophilic groups but does not contain the monomers of the instant invention.

JP 5214274A—Komazaki Shigeru et al.—Contains hydrophilic and hydrophobic groups but based on N-acrylic imidazole modifications.

U.S. Pat. No. 4,883,852, Shigeru, Masuoka, Hiroshi Dor, Nippon Oil and Fats Co., 1989, describes and claims marine antifouling paints which contain a polysiloxane polymer and a copolymer which may be methacrylate ester/polysiloxane polymer.

U.S. Pat. No. 5,767,171, Matrubara, Yoskisa et al. NOF Comp., 1995 Contains silylacrylates. Describes and claims marine antifoulant coatings containing copolymers of monomers which contain an acryloyloxy or methacryloyloxy group and triorganosilyl group. A third vinyl monomer may be present. Does not disclose a fluoro-containing moiety.

U.S. Pat. No. 4,593,055, Melvin Gitlitz et al, M&T Chemicals (1986). Describes erodible ship bottom paints for controlling marine fouling which are characterized by including a hydrolysable organosilylacrylic copolymer. No fluoro-monomer is disclosed.

Surface Coatings International (1999), 82 (12) Bready R F for et al. describes waterborne fluoropolymer coatings for marine fouling resistance.

JP 05186715A2—Kido, Koichiro et al, 1993, describes marine antifoulant coatings which may contain acrylates and methacrylates as well as 2,2,2-trifluoro ethylacrylates, but it does not describe the presence of hydrolysable silylacrylate groups.

JP 61097374A2, Fuyuki, Toro et al, 1986. Paint additives for marine structures are prepared by copolymerizing fluoroethyl monomers and (meth)acrylates. No silylacrylates are listed.

"Fluorinated Polymer, Synthesis Properties and Application", Ameduri, Bruno et al. Actual Chemi (2000), (2) 23–32, discusses the synthesis, properties and applications of fluorinated polymers.

U.S. Pat. No. 4,410,363—Robert Supcoe, et al, 1983 Marine Antifouling Paint Containing Fluorinated Waxes.

2,2,2-Trifluoroethylmethacrylate (matrife) is one of the monomers used in the marine antifoulant coatings of the instant invention. Matrife has been used in applications other than marine paints. Examples include: WO 9905548A1—Yamashita, Tomoyou (Mitsubishi Rayon) 1999, Graded Index Plastic Optical Fiber; WO 9125962A1—Imafuku, Sujuru et al, 1996. Copolymers for the production of soft intra-occular lenses;

JP 8134381—Yamashita Tatashi et al, 1998. Toray Industrial. This patent claims an antifouling method characterized in that it has a composition that contains a copolymer obtained by polymerizing as essential components: 50 to 99 weight percent of a fluorine containing polymerizable monomer and 1 to 50% of a compound having at least 1 hydrolysable silyl group per molecule and that contains an organopolysiloxane that has reactivity with the hydrolysable silyl group in its side claim and/or terminal. However, the Japanese patent differs from the instant invention in significant ways, such as the hydrolysable silylacrylate has pendant reactive groups, for example, tri alkoxy silylacrylate versus alkyl silylacrylate in the instant invention. The alkoxy silylacrylate form will react with a substituted polysiloxane while the trialkylsilylacrylate will not.

Antifoulant paints containing both fluoro and silylacrylate groups are disclosed in several patents: JP 8134381, Yamashita, Jotoshi et al, 1998, Toray Industries, as noted in above, discloses a binder and a toxicant for marine paint, the binder comprising a (meth) acrylate copolymer which has been substituted with a hydrolysable silylacrylate group copolymerized with a fluoro (meth) acrylate monomer and a polysiloxane. However, it is apparent that the silyl acrylate group can be hydrolyzed both at the acrylate silicon substituent and at the other silicon substituent sites since these sites are alkoxy groups; thus, hydrolysis of more than one silicon substituent would result in extensive crosslinking between the binder backbone and the polysiloxane additives. The silicon substituents of the present invention other than the acrylate functionality are based on non-hydrolysable alkyl groups. Thus, crosslinking through the polysiloxane additive would be minimal, if at all.

U.S. Pat. No. 5,912,286, Griffith, James R. et al 1997. A fluoro-epoxy compound and a silicone amine curing agent comprising a polymer matrix for a binder of a leachable organic compound for us in marine antifouling coatings.

SUMMARY OF THE INVENTION

The present invention provides improved polymers useful as binders in self polishing marine antifoulant paints and the resulting marine antifoulant paint containing the polymer. The new polymers are made from at least three distinct monomers units selected from the group consisting of fluorinated acrylic monomers, (e.g. 2,2,2-Trifluoroethylmethacrylate (matrife)), triorganosilylacrylic monomers, (e.g.trimethylsilyl methacrylate) and acrylic monomers not containing an organosilyl moiety, (e.g. methyl methacrylate). The three component polymer (i.e. terpolymer) can optionally contain from 0–5 weight percent of a cross-linking agent. The terpolymers are novel compositions useful as polymeric binders in long life marine antifoulant coatings. The erosion rate and resistance to cracking of the polymer of the present invention when used as a binder in a marine antifoulant paint is controlled by adjusting the proportions of each monomer and the amount of cross-linking agent in the copolymer. The polymer of the present invention is a copolymer comprising the reaction product of:

a. a monomer of the formula:

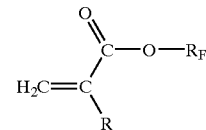

wherein R is $CH_3$ or H, and $R_F$ is $(C)_u(CH)_v(CH_2)_w(CF)_x(CF_2)_y(CF_3)_z$ where u is from 0 to 1, v is from 0 to 1, w is from 0 to 20, x is from 0 to 1, y is from 0 to 20, z is from 1 to 3, and the sum of w and y is from 0 to 20, b. a monomer of the formula:

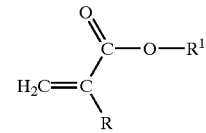

wherein R is $CH_3$ or H, and $R^1$ alkyl or aryl, and c. a monomer of the formula:

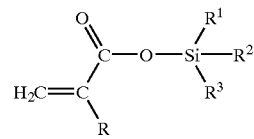

wherein R is $CH_3$ or H, and $R^1$, $R^2$, and $R^3$ can be the same or different and are non-hydrolysable alkyl groups containing from 1 to 20 carbon atoms and/or non-hydrolysable aryl groups containing from 6 to 20 carbon atoms.

Also provided are marine antifoulant paints containing as a binder a copolymer of monomers a, b, and c as defined above.

DETAILED DESCRIPTION OF THE INVENTION AND PREFERRED EMBODIMENTS

Figure 1:
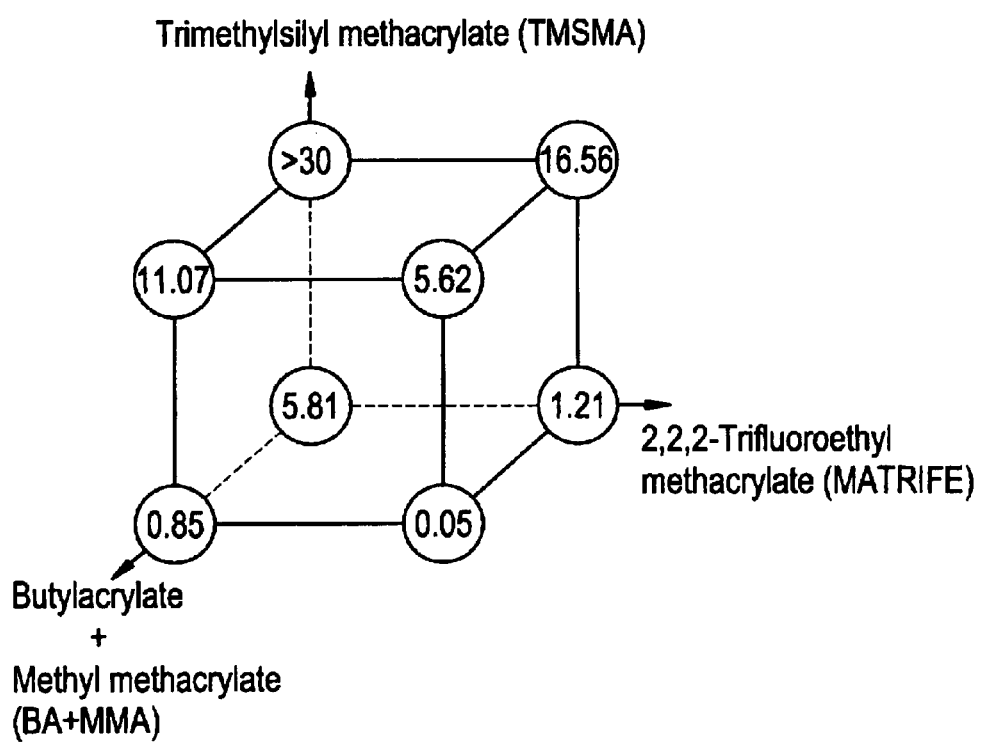
FIG. 1 is a three dimensional plot of monomer components in the copolymer and the corresponding erosion rate ($\mu$/hour) for the resulting copolymer film. Monomer b is plotted on the axis designated x using a scale of 0.050 moles to 0.065 moles; monomer a is plotted on the axis designated y using a scale of 0 to 0.005 moles; and, monomer c is plotted on the axis designated z using a scale of 0.020 to 0.033 moles.

Copolymers of monomers a, b, and c as defined in the Summary of the Invention have suitable erosion rates for use in marine antifoulant paints. A desired erosion rate can be achieved for a copolymer of monomers a, b and c by adjusting the proportions of the monomers used to produce the copolymer. Such predetermined erosion rate is achieved by selecting the proportions of monomers a, b, and c in accordance with the data and teachings contained herein and graphically depicted in FIG. 1. FIG. 1 is a three dimensional plot of monomer components in the copolymer and the corresponding erosion rate for the resulting copolymer film. The plot in FIG. 1 shows erosion rate for a copolymer film of the present invention ($\mu$/hour) plotted as a function of the monomer components in the copolymer. Monomer b is plotted on the axis designated x using a scale of 0.050 moles to 0.065 moles; monomer a is plotted on the axis designated y using a scale of 0 to 0.005 moles; and, monomer c is plotted on the axis designated z using a scale of 0.020 to 0.033 moles.

Monomer a. Monomer a is a monomer of the formula:

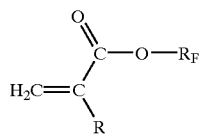

wherein R is $CH_3$ or H, and $R_F$ is $(C)_u(CH)_v(CH_2)_w(CF)_x(CF_2)_y(CF_3)_z$ where u is from 0 to 1, v is from 0 to 1, w is from 0 to 20, x is from 0 to 1, y is from 0 to 20, z is from 1 to 3, and the sum of w and y is from 0 to 20.

2,2,2-Trifluoroethylmethacrylate (matrife) is the preferred selection for monomer a. Other preferred sections for monomer a include trifluoromethyl acrylate and methacrylate, 3,3,3-trifluoropropyl acrylate and methacrylate, hexafluoroisopropyl acrylate and methacrylate, 2,2,2-trifluoroethyl acrylate, and perfluoro-t-butyl acrylate. Mixtures of monomers of the formula for monomer a may be employed in making copolymers of the present invention. Preferably monomer a should comprise from 0.5 mole % to 10 mole % of the reactants used to make the copolymer with from 1% to 5% being particularly preferred.

Monomer b. Monomer b is a monomer of the formula:

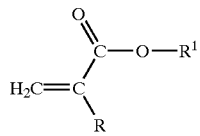

wherein R is $CH_3$ or H, and $R^1$ is alkyl or aryl.

Some typical examples of some of these are: alpha-acetoxy ethyl acrylate, alpha-chloro methyl acrylate, ferrocenylmethyl acrylate, isobutyl acrylate, and phenyl acrylate. Alkylmethacrylates; benzyl alkylmethacrylate, chloromethyl alkylmethacrylate, cyanomethyl alkylmethacrylate, 2-hydroxypropyl alkylmethacrylate, 2-phenethyl alkylmethacrylate methyl acrylate, ethyl acrylate, butyl acrylate, ethyl methacrylate, butyl methacrylate, isobutyl methacrylate, isooctyl acrylate, 2-ethylhexyl methacrylate, nonyl acrylate, nonyl methacrylate, lauryl methacrylate, stearyl methacrylate, dimethylaminoethyl acrylate, 2-methoxyethyl acrylate, 2-ethoxylethyl methacrylate, 2-ethylhexyl acrylate, t-butylaminoethyl methacrylate, ethylhexyl methacrylate and acrylate, methoxyethyl acrylate and methacrylate, butyl acrylate and methacrylate, ethyl acrylate and methacrylate, and benzyl acrylate and methacrylate.

Preferred selections for monomer b are Methyl methacrylate and butyl acrylate. Additional acrylate monomers such as: alpha-acetoxy ethyl acrylate, alpha-chloro methyl acrylate, ferrocenylmethyl acrylate, isobutyl acrylate, and phenyl acrylate. Alkylmethacrylates; benzyl alkylmethacrylate, chloromethyl alkylmethacrylate, cyanomethyl alkylmethacrylate, 2-hydroxypropyl alkylmethacrylate, 2-phenethyl alkylmethacrylate methyl acrylate, ethyl acrylate, butyl acrylate, ethyl methacrylate, butyl methacrylate, isobutyl methacrylate, isooctyl acrylate, 2-ethylhexyl methacrylate, nonyl acrylate, nonyl methacrylate, lauryl methacrylate, stearyl methacrylate, dimethylaminoethyl acrylate, 2-methoxyethyl acrylate, 2-ethoxylethyl methacrylate, 2-ethylhexyl acrylate, and t-butylaminoethyl methacrylate. Examples for monomer b are ethylhexyl methacrylate and acrylate, methoxyethyl acrylate and methacrylate, butyl acrylate and methacrylate, ethyl acrylate and methacrylate, and benzyl acrylate and methacrylate. Mixtures of monomers of the formula for monomer b may be employed in making copolymers of the present invention. Preferably monomer b should comprise from 40 mole % to 95 mole % of the reactants used to make the copolymer with from 57% to 89% being particularly preferred.

Monomer c is a monomer of the formula:

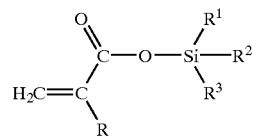

wherein R is $CH_3$ or H, and $R^1$, $R^2$, and $R^3$ can be the same or different and are non-hydrolysable alkyl groups containing from 1 to 20 carbon atoms and/or non-hydrolysable aryl groups containing from 6 to 20 carbon atoms.

Preferred for monomer c are acrylic or methacrylic esters having a hydrolysable functional group, e.g., a silylacrylate. There is also present one or more copolymerizable ethylenically unsaturated monomers. Preferably monomer c should comprise from 5 mole % to 65 mole % of the reactants used to make the copolymer with from 12% to 40% being particularly preferred. Mixtures of monomers of the formula for monomer c may be employed in making copolymers of the present invention.

Monomer a's function in the copolymer is to impart hydrophobicity to the copolymer film. The copolymer functions as a binder for the marine antifoulant paint. Controlling the quantity of monomer a in the copolymer affects the hydrophobicity of the copolymer which affects the softening and erosion rate of a film of the polymer in a marine environment.

The hydrophobic/hydrophilic balance of the copolymer is controlled by varying the proportion of monomers a, b, and c in the copolymer.

Cross-linking agent: If it is desired to obtain additional control over the hardness and erosion rate of the copolymer, a cross-linking agent may be included in the reactants used to make the copolymer. Preferred cross-linking agents are dienes or higher unsaturated monomers such as linalyl acetate, meryl acetate, dialkyl succinate, and fuctionalized butadiene compounds. If used, 5 or less mole % cross-linking agent should be employed.

Marine antifoulant paints. In addition to a binder or film former, marine antifoulant paints may contain other optional ingredients. Examples of such ingredients are a toxicant, a pigment, solvents and adjuvants to aid in adhesion, flow, color, viscosity, stability, etc. The range of compositions for marine antifoulant application is enormous, has evolved from changing needs, and is well known to those skilled in the art of this invention.

Erosion Rate:

The procedure used to measure the erosion rates of polymer films and formulated paints is the same as described in U.S. Pat. No. 4,021,392, column 6, lines 27 to 54, which is incorporated herein by reference with the following modifications:

A. The substrate used is a poly(methyl methacrylate) or poly(carbonate) disc having a diameter of 8 inches. This disc is coated directly with radial stripes of polymer films or formulated paints.

B. The thickness of the dried films are measured using contact profilometry; specifically a Tencor Alpha Step 500 profiler, as a function of seawater immersion/revolution time.

C. The speed of the disk at the measured circumference point (8.0 cm radius) is 17 knots, and the temperature of the seawater is maintained at 20±3° C.

"Erosion Rates" as used herein is defined as the erosion rate determined by the above referenced procedure. The preferred Erosion Rates are erosion rates of 1–200 μ/month, especially preferred are Erosion Rates of 1.5–50 μ/month, and most preferably 1.5–15 μ/month. Initial film thickness was typically 35–90 microns with an average thickness of 60 microns. For marine antifoulant paints, the thickness of the paint film applied to the ship hull depends on paint composition, desired lifetime of the paint on the hull and on the erosion rate of the paint binder in a marine environment.

EXAMPLES

Polymers of the present invention were synthesized in the manner described below, from monomers, and in the proportions and amounts stated in Tables 1, 2, 3 and 4. Also listed in those tables are comparative polymers. A total of 54 different polymers were synthesized and are reported in Tables 1, 2, 3 and 4:

Synthetic Procedure

A 250 mL 3-neck round bottom reaction flask equipped with a dry ice condenser, an addition funnel, and a thermometer was placed under a nitrogen atmosphere. One-half of the total volume of degassed anhydrous m-xylene was transferred to the reaction flask under nitrogen, and the liquid was stirred and heated to 85±2° C.

In a 250 mL Erlenmeyer flask, a monomer batch was prepared by charging the flask with the remaining volume of anhydrous m-xylene, the fluorinated monomer, the silylated monomer, any other co-monomers, and azoisobutyrlnitrile (AIBN, see Table 1). The monomer batch was capped, and the resulting solution was sparged with nitrogen for 10 minutes. The monomer batch thus prepared was then transferred under nitrogen to the reaction flask addition funnel.

Over the course of 30 minutes, the monomer batch was dripped into the heated, stirring m-xylene. The resulting mixture was then heated for an additional 3 hours at 85±2° C. After this heating period, the mixture was heated at 115±2° C. for 30 minutes in order to consume any residual monomers and/or initiator.

TABLE 1

Monomer mixtures for the synthesis of tetrapolymers. (Amounts shown are in grams.)

| Run # | 2,2,2-Trifluoroethyl methacrylate (monomer a) | Trimethylsilyl methacrylate (monomer b) | Methyl methacrylate (monomer c) | Butyl acrylate (monomer c) | AIBN | m-Xylene |
|---|---|---|---|---|---|---|
| 1 | 0.000 | 3.166 | 4.005 | 3.204 | 0.034 | 20 |
| 2 | 0.841 | 5.223 | 8.010 | 1.282 | 0.051 | 31 |
| 3 | 0.841 | 3.166 | 8.010 | 3.204 | 0.052 | 31 |
| 4 | 0.000 | 5.223 | 4.005 | 1.282 | 0.033 | 20 |
| 5 | 0.841 | 3.166 | 4.005 | 1.282 | 0.030 | 18 |
| 6 | 0.000 | 3.166 | 8.010 | 1.282 | 0.044 | 26 |
| 7 | 0.841 | 5.223 | 4.005 | 3.204 | 0.041 | 25 |
| 8 | 0.000 | 5.223 | 8.010 | 3.204 | 0.055 | 33 |
| 9 | 0.841 | 3.166 | 8.010 | 1.282 | 0.046 | 28 |
| 10 | 0.841 | 3.166 | 4.005 | 3.204 | 0.036 | 22 |
| 11 | 0.000 | 3.166 | 8.010 | 3.204 | 0.050 | 30 |
| 12 | 0.841 | 5.223 | 8.010 | 3.204 | 0.057 | 34 |
| 13 | 0.000 | 5.223 | 8.010 | 1.282 | 0.049 | 30 |
| 14 | 0.000 | 3.166 | 4.005 | 1.282 | 0.028 | 17 |
| 15 | 0.000 | 5.223 | 4.005 | 3.204 | 0.039 | 24 |
| 16 | 0.841 | 5.223 | 4.005 | 1.282 | 0.035 | 21 |
| 17 | 0.421 | 4.195 | 6.008 | 2.243 | 0.043 | 26 |
| 18 | 0.421 | 4.195 | 6.008 | 2.243 | 0.043 | 26 |

TABLE 2

Polymers prepared in similar procedures to that described. (Amounts shown are in mole percentages.)

| Run # | 2,2,2-Trifluoroethyl methacrylate | Trimethyl silyl methacrylate | Methyl methacrylate | t-Butyl methacrylate | Methoxyethyl acrylate | Methacryloyl oxyethyl acetoacetate |
|---|---|---|---|---|---|---|
| 19 | — | 33 | 67 | — | — | — |
| 20 | 1 | 33 | 66 | — | — | — |
| 21 | 5 | 33 | 62 | — | — | — |
| 22 | 5 | 33 | 62 | — | — | — |
| 23 | 10 | 33 | 48 | — | — | — |
| 24 | 15 | 33 | 52 | — | — | — |
| 25 | 15 | 33 | 52 | — | — | — |
| 26 | 7 | 26 | 67 | — | — | — |
| 27 | 10 | 23 | 67 | — | — | — |
| 28 | 1 | 24 | 75 | — | — | — |
| 29 | 3 | 22 | 75 | — | — | — |
| 30 | 5 | 20 | 75 | — | — | — |
| 31 | 7 | 18 | 75 | — | — | — |
| 32 | 10 | 15 | 75 | — | — | — |
| 33 | 15 | 15 | 70 | — | — | — |
| 34 | 7 | 7 | 86 | — | — | — |
| 35 | — | — | 67 | 33 | — | — |
| 36 | — | 18 | 67 | 15 | — | — |
| 37 | 4 | 18 | 63 | 15 | — | — |
| 38 | — | — | 67 | — | 33 | — |
| 39 | 4 | 18 | 58 | — | 20 | — |
| 40 | — | 18 | 67 | — | 15 | — |
| 41 | 4 | 18 | 63 | — | 15 | — |
| 42 | — | — | 67 | — | — | 33 |

TABLE 2-continued

Polymers prepared in similar procedures to that described. (Amounts shown are in mole percentages.)

| Run # | 2,2,2-Trifluoroethyl methacrylate | Trimethyl silyl methacrylate | Methyl methacrylate | t-Butyl methacrylate | Methoxyethyl acrylate | Methacryloyl oxyethyl acetoacetate |
|---|---|---|---|---|---|---|
| 43 | — | 18 | 67 | — | — | 15 |
| 44 | 4 | 18 | 63 | — | — | 15 |

TABLE 3

Polymers prepared in similar procedures to that described. (Amounts shown are in mole percentages.)

| Run # | 2,2,2-Trifluorethyl methacrylate | Trimethylsilyl methacrylate | Methyl methacrylate | Butyl acrylate |
|---|---|---|---|---|
| 45 | 3 | 33 | 59 | 5 |
| 46 | 3 | 33 | 54 | 10 |
| 47 | 3 | 33 | 49 | 15 |
| 48 | 3 | 33 | 44 | 20 |
| 49 | 3 | 33 | 32 | 32 |
| 50 | 3 | 33 | 0 | 64 |
| 51 | 7 | 18 | 67 | 8 |
| 52 | 7 | 18 | 55 | 20 |
| 53 | 7 | 18 | 0 | 75 |

Erosion Rates

The experimental erosion rate results are shown in Table 4. Specifically, FIG. 1 showing experimental design data clearly illustrates the effect of an added fluorinated monomer on the erosion characteristics of silyl copolymers.

TABLE 4

Experimentally determined erosion rate results and film characteristics for polymers referred to in Tables 1–3.

| Run # | Erosion Rate |
|---|---|
| 1 | 0.85 μ/h for 3 days (d) |
| 2 | 1.79 μ/h for 1 d |
| 3 | 0.049 μ/h for >20 d |
| 4 | Gone after 3 h |
| 5 | 1.21 μ/h for 3 d |
| 6 | 0.19 μ/h for 2 d |
| 7 | 5.62 μ/h |
| 8 | 0.67 μ/h for 3 d |
| 9 | 0.1 μ/h for 7 d |
| 10 | 0.054 μ/h for 14 d |
| 11 | Did not erode |
| 12 | 0.44 μ/h for 3 d |
| 13 | 9.55 μ/h |
| 14 | 5.81 μ/h |
| 15 | 11.07 μ/h |
| 16 | 16.56 μ/h |
| 17 | 3.89 μ/h |
| 18 | 3.85 μ/h |
| 19 | gone after 1 d |
| 20 | gone after 1 d |
| 21 | gone after 1 d |
| 22 | gone after 1 d |
| 23 | gone after 1 d |
| 24 | gone after 1 d |
| 25 | gone after 1 d |
| 26 | gone after 2 d |
| 27 | gone after 3 d |
| 28 | gone after 1 d |
| 29 | gone after 1 d |
| 30 | gone after 3 d |
| 31 | gone after 4 d |

TABLE 4-continued

Experimentally determined erosion rate results and film characteristics for polymers referred to in Tables 1–3.

| Run # | Erosion Rate |
|---|---|
| 32 | gone after 7 d |
| 33 | Did not erode |
| 34 | Did not erode |
| 35 | Did not erode |
| 36 | Did not erode |
| 37 | Did not erode |
| 38 | Did not erode - lifetime > 1 month |
| 39 | 4.3 μ/h |
| 40 | 1.7 μ/h |
| 41 | Did not erode |
| 42 | Did not erode |
| 43 | 6.2 μ/h (rough erosion) |
| 44 | 9.4 μ/hour |
| 45 | 5.2 μ/hour |
| 46 | 3.2 μ/hour |
| 47 | 3.1 μ/hour |
| 48 | 4.3 μ/hour |
| 49 | too soft |
| 50 | 9.4 μ/hour |
| 51 | film cracked |
| 52 | 0.24 μ/h |
| 53 | too soft |

Marine Antifoulant Paint

A marine antifoulant paint was prepared with the polymer of run #52. The paint was prepared by combining the polymer of run #52 with the following ingredients in the weight percentages indicated:

| | |
|---|---|
| Polymer solution (45% solids) | 47.0 g |
| B66 (poly-Methylbutylmethacrylate; 51% solids) | 2.3 g |
| Cuprous oxide | 50.2 g |
| Iron oxide | 25.3 g |
| Cab-O-Sil | 1.0 g |
| Xylene | 10.4 g |

The components were mixed in a small paint can. Approximately 100 g of metal shot was added, and the mixture was shaken for 45 min until a finely dispersed marine antifoulant paint resulted.

The Erosion Rate was determined for the paint using the above stated procedure. The antifoulant paint had an Erosion Rate of 0.07 μ/day. Preferred Erosion Rate for marine antifoulant paints made with polymeric binders of the present invention is from 0.01 to 0.10 μ/day which corresponds approximately to an effective film life for the antifoulant paint on a ships hull of approximately 5 years while the antifoulant paint is exposed to water, either seawater or freshwater.

We claim:

1. A polymer suitable for use as a marine antifouling coating comprising a copolymer of:
   a. a monomer of the formula:

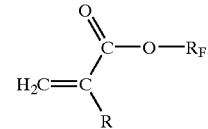

wherein R is $CH_3$ or H, and $R_f$ is $(C)_u(CH)_v(CH_2)_w(CF)_x(CF_2)_y(CF_3)_z$ where u is from 0 to 1, v is from 0 to 1, w is from 0 to 20, x is from 0 to 1, y is from 0 to 20, z is from 1 to 3, and the sum of w and y is from 0 to 20, b. a monomer of the formula:

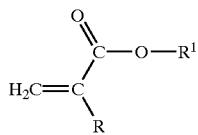

wherein R is $CH_3$ or H, and $R^1$ is alkyl or aryl, c. a monomer of the formula:

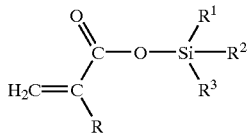

wherein R is $CH_3$ or H, and $R^1$, $R^2$, and $R^3$ can be the same or different and are non-hydrolysable alkyl groups containing from 1 to 20 carbon atoms and/or a non-hydrolysable aryl groups containing from 6 to 20 carbon atoms.

2. The polymer of claim 1 wherein monomer (a) is 2,2,2-Trifluorethyl metbacrylate.

3. The polymer of claim 1 wherein the monomers are essentially free of crosslinkable moieties.

4. The polymer of claim 3 wherein the monomers (c) are essentially free of alkoxy groups.

5. The polymer of claim 3 wherein the monomer (c) comprises trimethylsilyl methacrylate.

6. The polymer of claim 1 having an Erosion Rate of from 1 μmonth to 200 μmonth.

7. The polymer of claim 6 wherein u=v=x=y=0 and w=z=1 for monomer (a) (2,2,2 trifluoroethlymethacrylate).

8. The polymer of claim 1 wherein the marine antifoulant property is obtained by controlled erosion of the surface of the polymer when exposed to water.

9. The polymer of claim 1 wherein a selection for monomer b is butyl acrylate and methyl methacrylate.

10. A marine antifoulant paint containing claim 1.

11. The marine antifoulant coating composition of claim 10 further comprising additives selected from the group consisting of a toxicant, pigment, filter, leveling agent, solvent, stabilizer, and retarder.

* * * * *